June 19, 1928.

I. E. McCABE 1,674,051

CONTROL FOR ELECTRICALLY OPERATED HEAT GENERATING SYSTEMS

Filed Feb. 1, 1926

INVENTOR
IRA E. McCABE
BY Langdon Moore
ATTORNEY

INVENTOR
IRA E. McCABE
BY
ATTORNEY

June 19, 1928. 1,674,051
I. E. McCABE
CONTROL FOR ELECTRICALLY OPERATED HEAT GENERATING SYSTEMS
Filed Feb. 1, 1926  7 Sheets-Sheet 4

INVENTOR
IRA E. McCABE
BY
ATTORNEY

June 19, 1928.

I. E. McCABE 1,674,051

CONTROL FOR ELECTRICALLY OPERATED HEAT GENERATING SYSTEMS

Filed Feb. 1, 1926     7 Sheets-Sheet 7

INVENTOR
IRA E. McCABE
BY
ATTORNEY

Patented June 19, 1928.

1,674,051

UNITED STATES PATENT OFFICE.

IRA E. McCABE, OF CHICAGO, ILLINOIS.

CONTROL FOR ELECTRICALLY-OPERATED HEAT-GENERATING SYSTEMS.

Application filed February 1, 1926. Serial No. 85,410.

This invention relates to a control for an electric circuit employed in the production of heat and more particularly to a safety control for electrically operating heat generating systems. While this invention is illustrated and described herein as part of a liquid fuel burning system, it is applicable as well to any other form of electric controlled heat generation where the failure of the device to produce the desired heat will operate the control to break the electric circuit employed therein.

It is an object of this invention to produce a device of the character described, which will upon closure of the electric circuit therethrough, first, close a circuit through a heating element thereby causing the control to close a circuit through a motor, or other device for generating the desired heat, second, be so constructed that the heat so generated will break the circuit through the heating element and maintain the heat generator in the electric circuit, and, third, upon failure for any reason of the device to generate the desired heat, after the circuit has been closed through the device, to break the motor circuit and require a manual resetting before the device will be again operative.

It is another object of this invention to provide an audible or visionable alarm to signal the necessity for manually resetting the device.

It is a further object of this invention to provide means operative by the movement of the parts enclosing the motor circuit after the first closure of the circuit through the device, to set the signal mechanism in operative position.

It is also an object of this invention, when employed in circuit with a motor operated heat generating system, to provide means in the motor circuit to either increase or decrease, in accordance with the desirability or necessity of the system the initial speed of the motor above or below the normal operative rate, which may be actuated by the setting of the alarm signal mechanism.

While the preferred forms of this invention are illustrated on the accompanying sheets of drawing, yet it is to be understood that minor detail changes may be made therein without departing from the scope thereof.

Figs. 3, 4, 5, and 6 are diagrammatically detailed views illustrating the operations of the switch parts when used in connection with a domestic oil burner system, illustrating the successive positions assumed by said parts during operation of the system.

Figure 7:
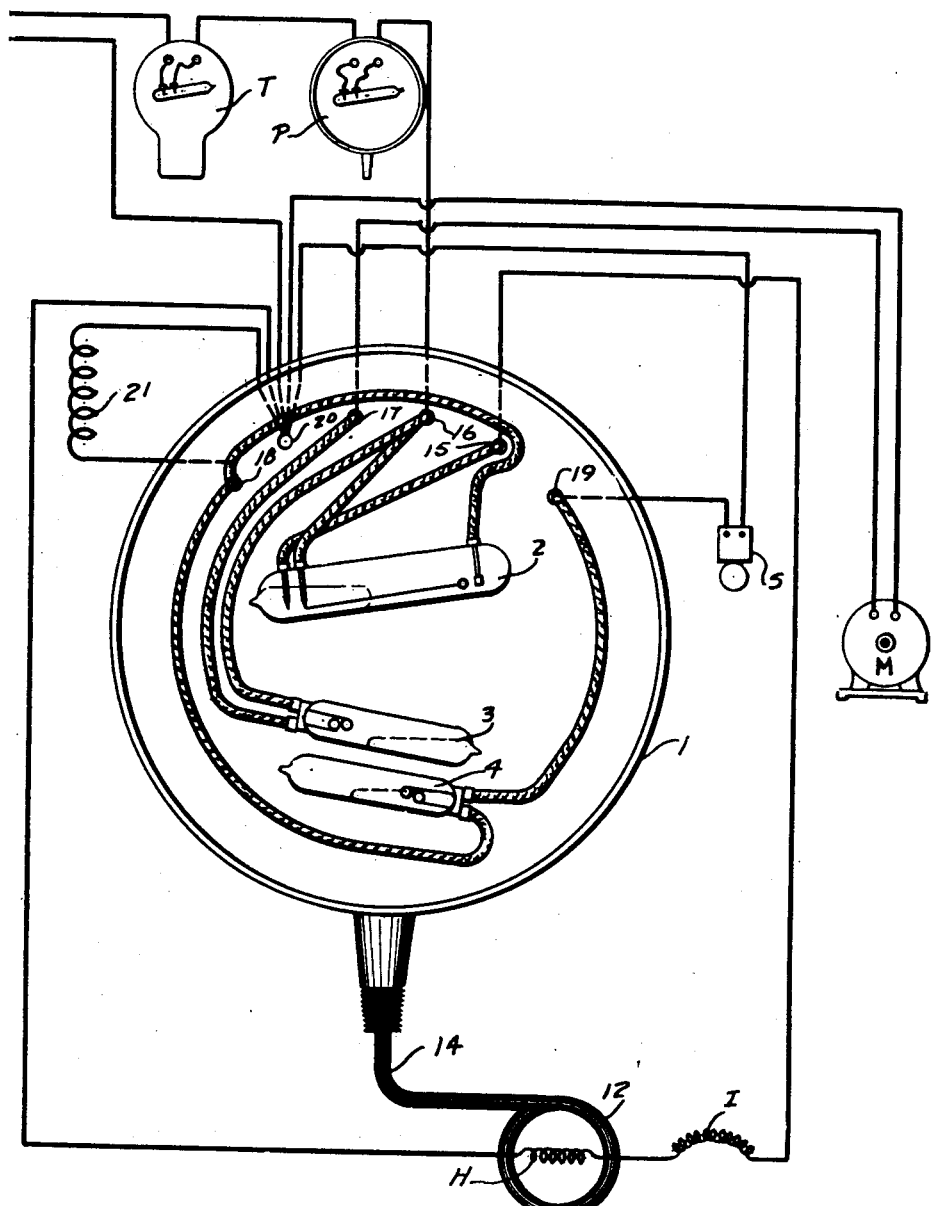

Fig. 7 is a diagrammatic view illustrating the wiring employed in this device in connection with a domestic oil burner.

Figure 8:
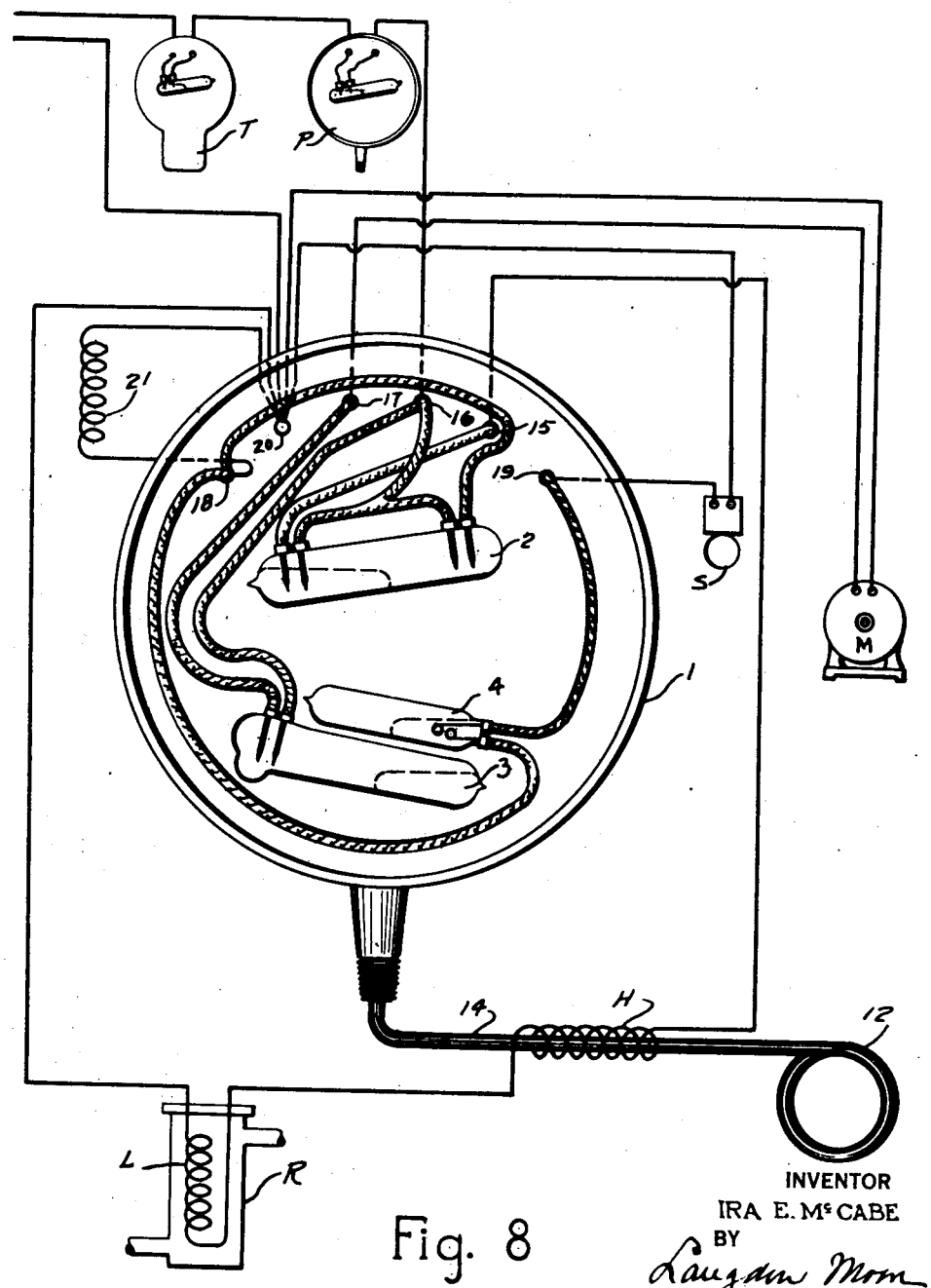

Fig. 8 is a similar view of the modified form.

Figure 9:
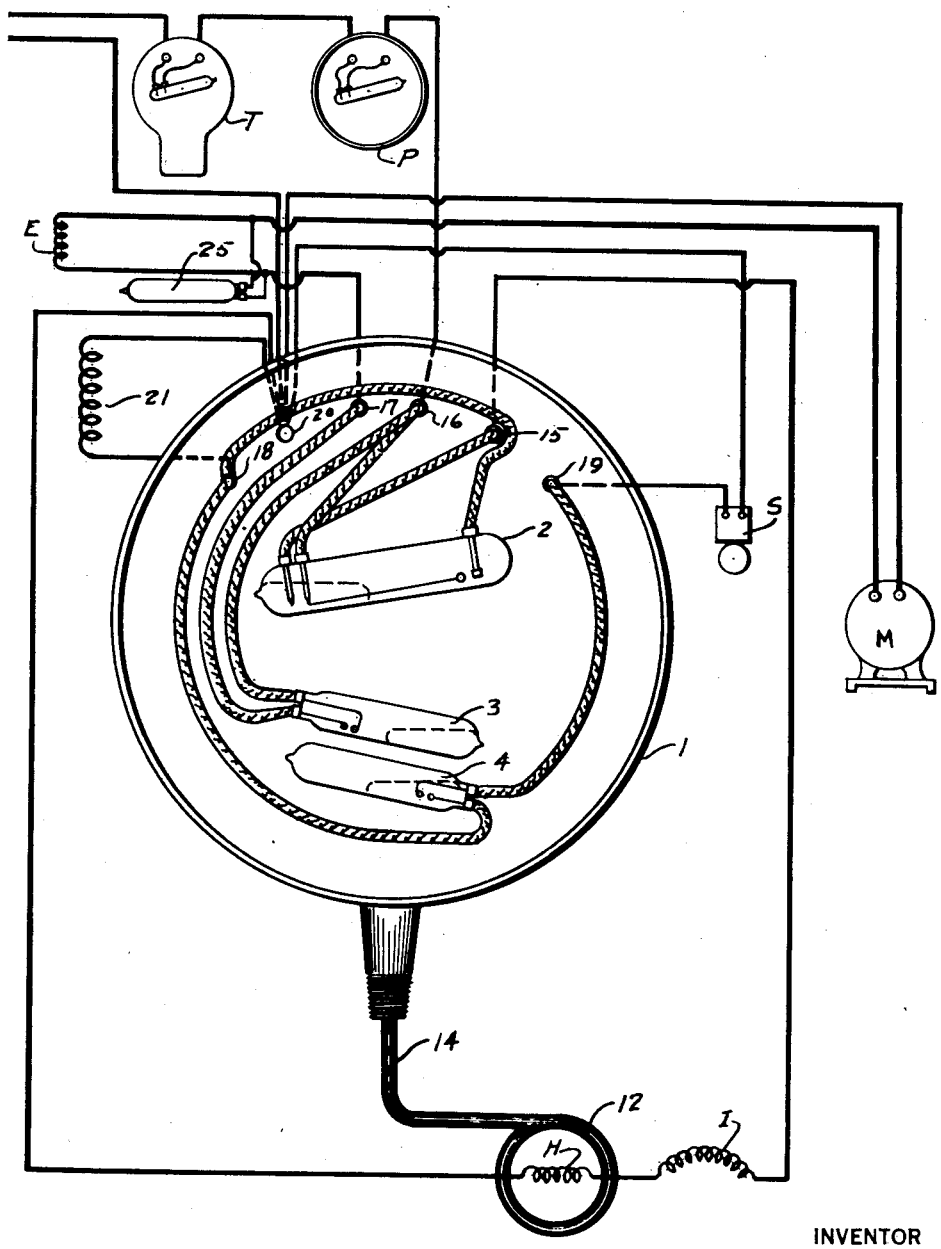

Fig. 9 is a similar view of another form of the same device.

Figure 1:
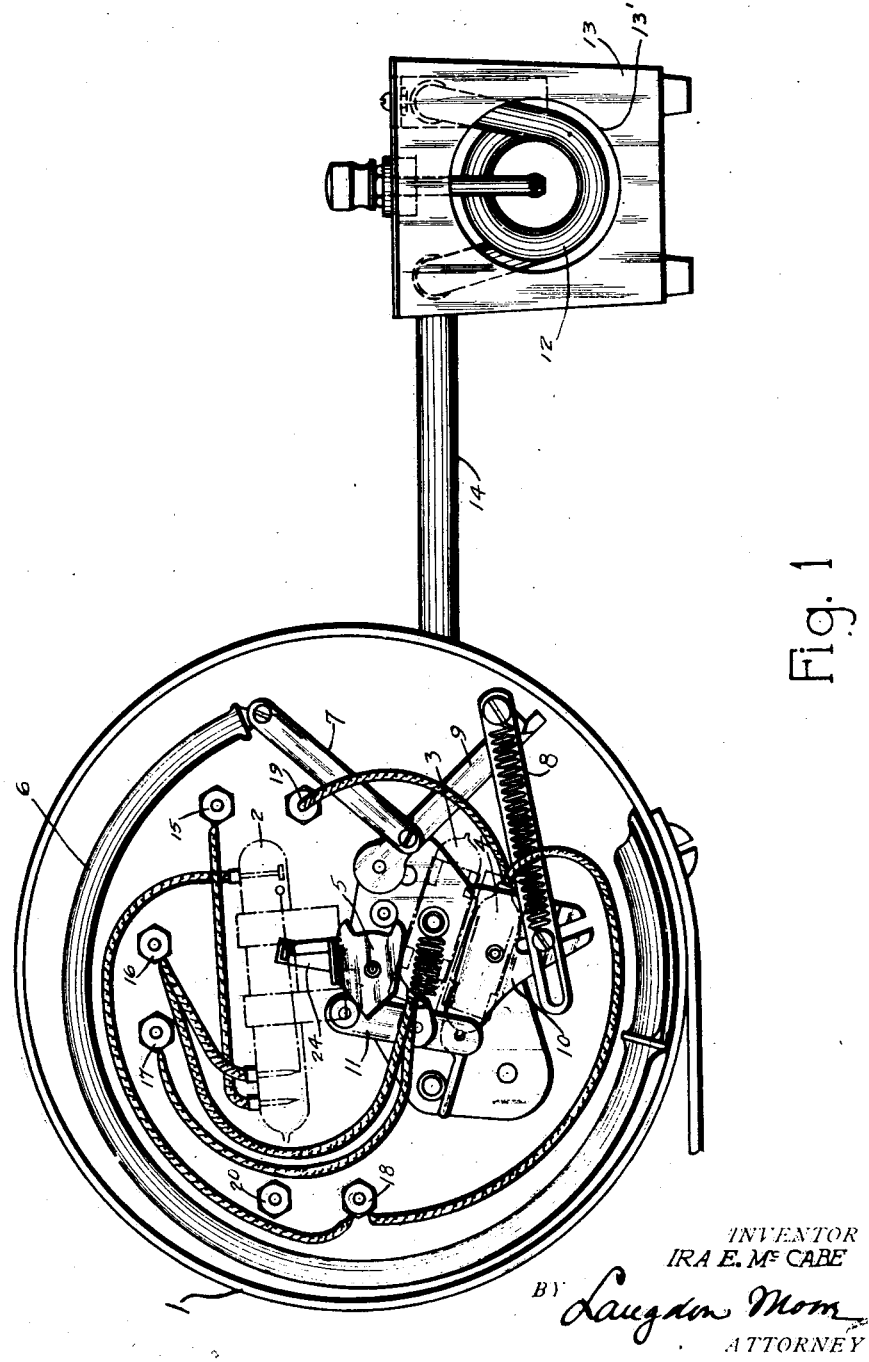
Fig. 1 is a view in front elevation of the instrument casing and thermal unit with the casing cover removed.
Figure 2:
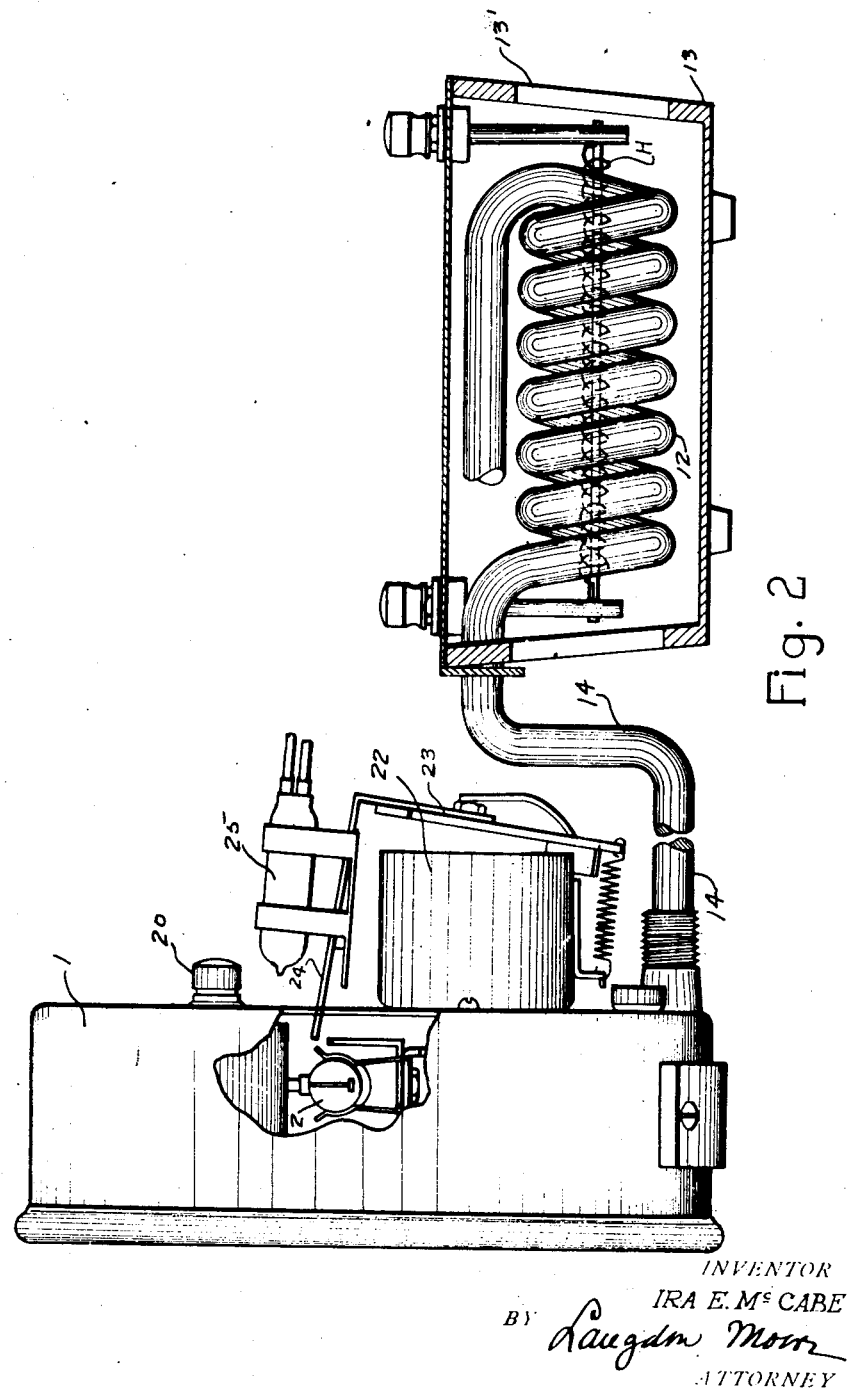
Fig. 2 is a view in side elevation of Fig. 1 with parts broken away and partly in section.

The embodiment of this invention as illustrated in Figs. 1 and 2 is particularly advantageous for use in connection with a liquid fuel burner system for generating heat in a furnace or boiler. The wiring of the device in one form of installation of this character is illustrated in Figure 7.

As seen in Figs. 1 and 2, the circuit closures are mounted in a casing 1, which may be attached to the burner, furnace or boiler or any stationary part adjacent thereto. The circuit closures comprise three mercury tubes, 2, 3, and 4, the upper one of which is mounted upon a pivoted support 5 which is caused to travel with an abrupt movement to make or break the circuit through the said closure 2 in a manner described in my prior pending application Serial No. 585,698, filed September 1, 1922, which is shown as comprising a Bourdon tube 6 mounted within the casing and is connected by pivoted links 7 and 8 through the operating lever 9 to a pivoted actuating member 10 which in turn through actuating link 11 engaging first one and then the other of the inclined portions of the pivoted support 5 causes the support to rotate about its pivot upon the expansion and contraction of the Bourdon tube. The interior of the Bourdon tube 6 is in connection with a thermal element 12 comprising a coil of piping containing a readily expansible and contractable fluid or gas which coil is preferably contained within a casing 13 and connected with the Bourdon tubing through a flexible piping 14. The casing 13 is preferably arranged adjacent the flame of the oil burner or heated air is taken from the flame through the casing 13 through openings 13′ so that the heat generated thereby will be readily transmitted to the thermal coil and thereby cause the fluid therein to expand and thereby effect an expansion and movement to the free end of the Bourdon tube.

The intermediate and lower mercury tube switches 3 and 4 are mounted in clips carried on the pivoted actuating member 10 and are so arranged in relation to each other as to carry out the functions hereinafter described.

As shown in Figure 1, the upper circuit closure 2 is in the form of a mercury tube switch having two terminals entering the interior of the tube adjacent the left hand end thereof and a third terminal entering the interior of the tube at the right hand end thereof with a rigid extension from the adjacent terminal at the other end terminating a short distance from the right hand terminal. The intermediate circuit closure 3 is in the form of a mercury tube switch with both terminals entering the left hand end of the tube and is arranged at an angle to the upper closure for a purpose hereinafter described. The lower circuit closure 4 is in the form of a mercury tube switch with both terminals entering the tube from the right hand end thereof and is arranged parallel and adjacent to the intermediate closure 3. The upper closure is secured to the pivoted support in such a manner and at such an angle that when the Bourdon tube is contracted, or in its normal position, the upper closure will cause the mercury therein to accumulate in the left hand end of the tube and close the circuit between the two terminals entering the tube adjacent that end, and while in this position of the upper closure, the intermediate and lower circuit closures 3 and 4 are arranged at such an angle to the upper closure 2 that the mercury in the intermediate closure 3 will accumulate at the right end thereof and break the circuit through the terminals extending through the left hand end and the lower closure 4 which is parallel to the intermediate closure will be carried at such an angle that the mercury therein will accumulate at the right hand end of the tube and close the circuit through the two terminals entering that end of the tube.

Five binding posts are provided upon the back of the casing for connecting flexible leads from the circuit closures therein to outside circuit connections as shown in Figs. 1 to 7 inclusive.

The left hand terminal of the pair of terminals entering the left hand end of the upper closure 2 is connected a binding post 15, the other terminal of said pair is connected to a second binding post 16 which in turn is connected to one terminal of the intermediate closure 3, the other terminal of which closure is connected to a third binding post 17. The terminal entering the right hand end of the upper closure 2 is connected to a fourth binding post 18 which binding post in turn is connected to one terminal in the lower closure 4, the other terminal of which closure is connected to a fifth binding post 19. All of the connections between the terminals and binding posts are preferably in the form of flexible leads.

Referring now to the diagrammatical wiring of the device as illustrated in Fig. 7, it is seen that one line leading from the commercial or other source of electricity passes through a room thermostat T, and a pressurestat P to the second mentioned binding post 16 so that in the position shown in Figs. 1 and 7, when the room thermostat and pressurestat are closed the incoming current will pass through the right hand terminal of the pair in the left hand end of the upper closure 2 to the first mentioned binding post 15 and from there through an ignition device I, preferably in the form of a coil of wire adapted to be brought to incandescence by the passage of current therethrough for the purpose of igniting the burner flame, and thence through a heat generating coil H passing through the thermal coil 12 of the Bourdon tube, as illustrated in Figure 2 and thence to a sixth binding post 20 extending from the exterior of the back of the casing 1, which latter binding post is connected to the other lead to the commercial or other source of electricity. When the upper closure 2 has been abruptly moved to the other limit of its movement by the expansion of the Bourdon tube, the circuit just described will be broken and another circuit will be completed through the extension from the right hand terminal of the pair located at the left hand end of the upper closure and the terminal entering the right end of the closure which leads to the fourth mentioned binding post 18, which binding post is also connected to one terminal of the lower closure 4 so that when the lower mercury switch tube has been swung into its closed position, the circuit will continue through the other terminal of said closure to the fifth mentioned binding post 19, which in turn is connected to one terminal of an electric bell or other electrically operated signal S, the other terminal of which signal is connected to the above mentioned binding post 20 upon the back of the casing and through this binding post back to the commercial line or other source of electricity. When the upper closure 2 is in a position to close this circuit and the lower closure 4 is in a position to open the circuit just described through the alarm S then the current passes through the fourth mentioned binding post 18 which is connected on the exterior of the casing to the coil 21 of an electric magnet, hereinafter to be described, and through such coil to the binding post 20 extending upon the back of the casing and connected to the source of commercial current.

When the circuit is broken through the left hand terminals of the upper closure 2, the commercial current entering the second mentioned binding post 16 passes to the terminal of the intermediate closure 3 and if the mercury tube forming this closure has been moved to close the circuit therethrough the current then passes to the third mentioned binding post 17 which is connected to one terminal of the electric motor M, the other terminal of which is connected to the exterior binding post 20 on the back of the casing in circuit with the commercial line.

Figure 3:
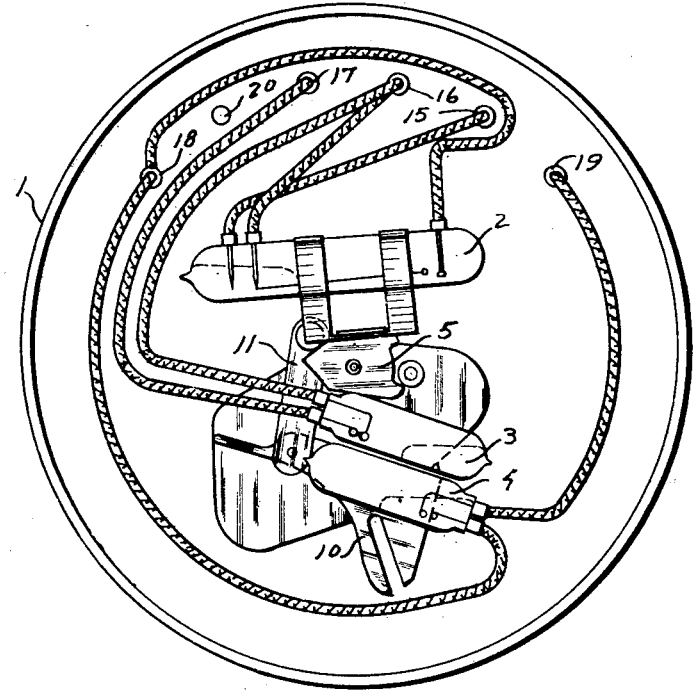
Figure 4:
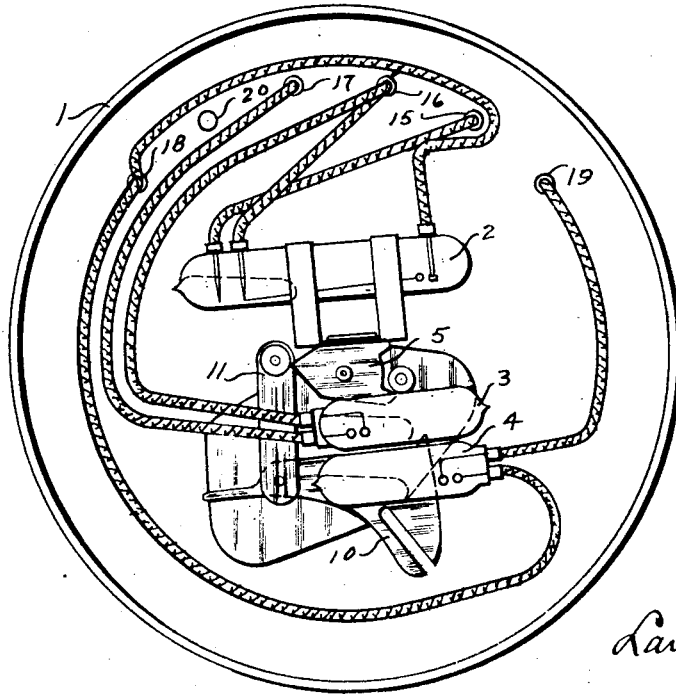

Having thus traced the circuits through the various positions of the closures 2, 3 and 4, reference is now had to Figs. 3 to 6, inclusive, which clearly illustrate the positions assumed by the various closures during the operation of the operating mechanism as the Bourdon tube expands. The position illustrated in Figure 3 is the normal position of the parts of this control and corresponds to the positions also illustrated in Figs. 1 and 7. In this position, the Bourdon tube is in its normal or contracted position. Upon closing of the circuit by the room thermostat, the circuit is completed through the upper closure 2, ignition device I, and electric heater H within the thermal element 12, and the motor circuit is open. The circuit through the electrically operated signal S while closed through the lower closure 4 is broken through the upper closure 2. The energizing of the igniter I and heating coil H upon the closure of this circuit not only raises the igniter I to incandescence preparatory to lighting the burner flame but also generates sufficient heat to affect the thermal coil 12 sufficiently to cause partial expansion of the Bourdon tube causing the actuating member 10 to partially rotate about its pivot as shown in Figure 4. The actuating member 10 supports or carries the intermediate and lower closures 3 and 4 so that as the free end of the actuating link 11 travels along one inclined edge of the pivoted upper closure supporting member 5 the movement of the pivoted actuating member 10 will change the angle between the intermediate and lower closures 3 and 4 and the upper closure 2 to such an extent that just before the free end of the actuating link 11 passes about the apex of the inclined sides of the upper closures supporting member 5 the circuit will be closed through the intermediate closure 3 and broken through the lower closure 4 and, as above described, the closing of the circuit through the intermediate closure 3 closes the circuit through the motor, thereby causing the operation of the oil burner mechanism which will be ignited by the incandescent igniter coil I. The increase in temperature caused by the ignition of the burner flame will cause the thermal coil 12 to continue the expansion of the Bourdon tube thereby causing further rotation of the actuating member 10 and causing the free end of the actuating link 11 to pass over the apex, engage the under inclined edge of the upper closure supporting member 5, and cause the upper closure 2 to be smartly swung to the other limit of its movement, thereby breaking the circuit through the left hand terminals which breaks the circuit through the ignition and heat coils I and H, while this further movement of the intermediate and lower closures 3 and 4 does not change their relation as above described.

Figure 5:
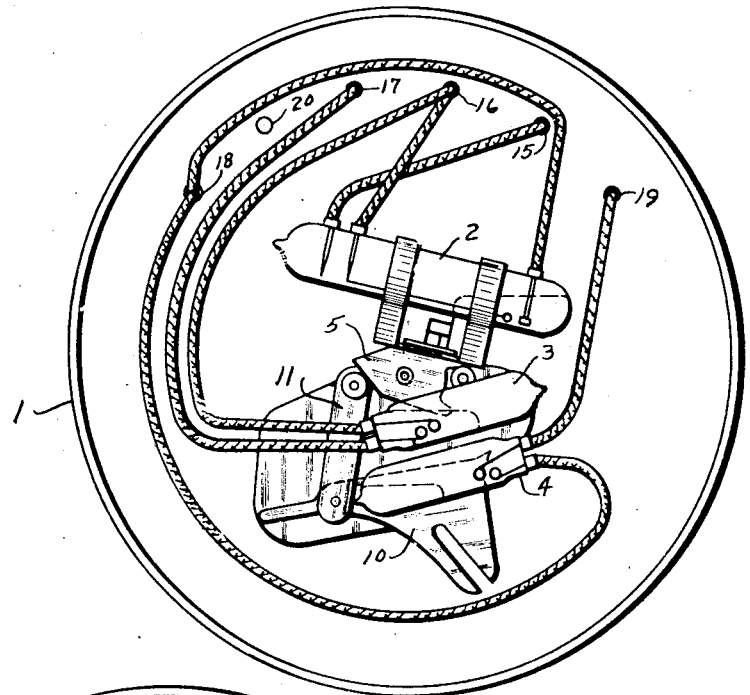
Figure 6:
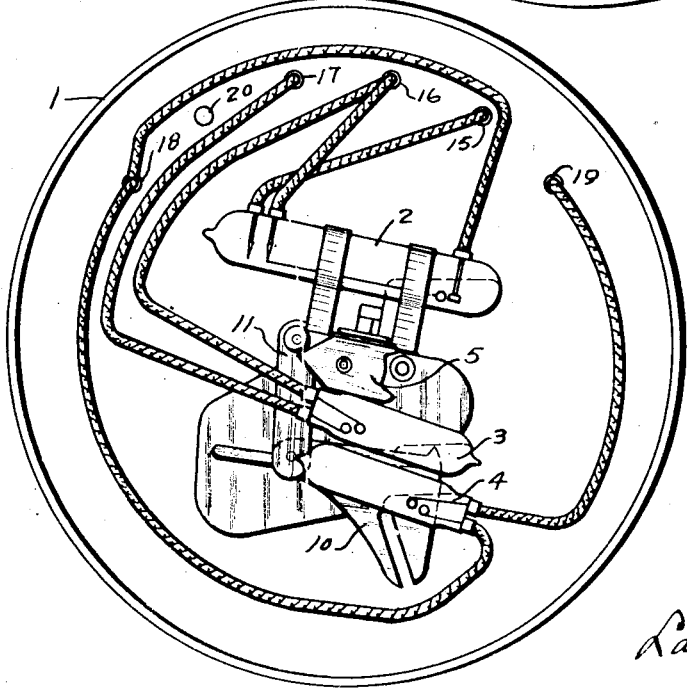

The electro-magnet 22 having the coil 21 in circuit between binding posts 18 and 20 is secured to the rear of the instrument and casing and is provided with a pivoted armature 23, having a coil spring normally maintaining the armature at the extreme of its movement away from the magnet, and having an angular extension 24 adapted to pass through an aperture in the rear wall of the casing, which angular extension when the electro-magnet is energized and the armature drawn thereto, will enter the interior of the casing above the upper closure supporting member 5 to lock the closure in that position. Figs. 1 and 2 illustrate the parts above described before the electro-magnet is energized while Figs. 5 and 6 illustrate the locking operation when the electro-magnet is energized. As above described the closure of the circuit through the room thermostat first closes the circuit through the igniter I and heater H causing the Bourdon tube to partially expand to the position illustrated in Fig. 4 which closes the motor circuit and upon ignition of the burner flame breaks the circuit through the igniter I and heater H and throws the upper closure into the position illustrated in Fig. 5 which closes the circuit through the coil 21 of the electromagnet thereby causing a locking engagement between the armature of the magnet and rotating support 5 of the upper closure as shown in the position illustrated in Figure 5. The position of the parts shown in Fig. 5 is the normal position when the burner mechanism is operating. The breaking of the circuit through either the thermostat T or pressurestat P at once discontinues the passage of the current to binding post 16, whereupon the magnet 21 is de-energized and the spring pressed armature moves out of locking engagement with the rotating support 5 and at the same time the motor M ceases to operate, then as the fuel supply has been discontinued the burner flame becomes extinguished and as a result thereof the coil 12 cools causing the Bourdon to contract which returns the parts to their normal position as shown in Figure 1. Should for any reason the burner flame become extinguished, the thermal coil 12 will cool immediately causing contraction of the Bourdon tube which will cause the actuating member 10 to return to the position illustrated in Figs. 1 and 3 causing the free end of the actuating link 11 to ride up over the apex of the angular sides of the supporting member 5 and engage the upper side thereof as shown in Figure 6. This operation would normally smartly return the upper closure 2 to the position illustrated in Figures 1 and 3 if it were not for the locking engagement with the armature of the electro-magnet. The locking of the upper closure 2 in the position shown in Figure 6 maintains circuit through the electro-magnet and the rotation of the actuating member 10 to the position shown in Figure 6 breaks the circuit through the motor and closes the circuit through the electric signal. In this locked position the signal will continue to operate and it is impossible to close the motor circuit by the room thermostat until the armature is manually withdrawn from the locking engagement with the upper closure 2. The action of the pivoted link in the position shown in Figure 6 as soon as the locking engagement is broken will cause the upper closure 2 to immediately assume the position shown in Figures 1 and 3 thereby breaking the circuit through the electro-magnet and electric signal S whereby the parts will be returned to the normal position shown in Figure 1 and be ready to be actuated by the closure of the room thermostat to operate the oil burner mechanism.

Figure 8 illustrates a modification of the oil burner system to which this device is applied. In the wiring diagram illustrated in Figure 8 it will be noticed that the igniter I for the burner flames has been omitted, as some other form of ignition has been provided. At times it is desirable to increase the normal temperature of the liquid fuel for the ignition of the burner and to accomplish this the first circuit closed by the device is adapted to include a heating element L which may be contained in the liquid fuel pipe line adjacent the burner mechanism or in a reservoir R provided therefor adjacent the burner mechanism so that upon closing of the circuit through the room thermostat the first circuit completed when the device passes through the thermal element of the Bourdon tube and then through the reservoir or liquid fuel pipe line so that as the temperature of the thermal element 12 is increased the temperature of the liquid fuel is also raised and by the time the Bourdon tube has partially expanded sufficiently to close the circuit through the motor and break the circuit through the heater and liquid fuel heater L, the said fuel will be of a temperature desirable for initial ignition. The other parts of this device in this form operate in the same manner as hereinbefore described.

Figure 9 illustrates the application of this device when it is desired to increase or decrease the initial speed of the motor after the motor circuit has been initially closed. This construction is diagrammatically illustrated on Figure 9 in which the operating parts and wiring connections are otherwise the same as illustrated in Figure 7. To accomplish the desired result an electrical resistance coil E is interposed in the circuit between the binding post 17 and one terminal of the electric motor which resistance will reduce the speed of the motor from that caused by the complete commercial current passing therethrough. To cut in and cut out this resistance an electric closure, preferably in the form of a mercury tube switch 25, having both terminals extending through one end thereof is connected in parallel between the binding post 17 and the terminal of the motor so that when the circuit through this closure is closed, the motor will operate at the normal speed, and with the full current of the commercial line.

To make or break the circuit through this resistance control closure it is preferable to support the mercury tube switch upon the armature of the electro-magnet as shown in Figure 2. As above described the partial expansion of the Bourdon tube, when the circuit is closed through the room thermostat, closes the motor circuit and further expansion of the Bourdon tube, while maintaining the motor circuit, closes the circuit through the electro-magnet so that by inserting the switch with the terminals in the positions shown in Figure 2, the energization of the electro-magnet breaks the circuit through tube 25 and causes the motor to slow down thereafter. Should it be desired to increase the speed of the motor, the mercury tube switch would be placed in the clips with the terminals extending from the left hand end of the tube so that when the electro-magnet is energized, the circuit through this closure would be closed, which would cut out the resistance and increase the speed of the motor to the rate of the commercial current.

What I claim is:

1. A safety control for an electrically operated heat generating system, a circuit closure in circuit with one pole of the source of electricity, a heating element in circuit with said closure and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the associated means will cause the second closure to be operated to close the motor circuit.

2. A safety control for an electrically operated heat generating system, a circuit closure in circuit with one pole of the source of electricity, a heating element in circuit with said closure and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the associated means will cause the second closure to be operated to close the motor circuit, a thermal element associated with the expansible and contractible member arranged to be effected by the heat generated by the system upon the operation of the motor to actuate said associated means to break the circuit through the first closure and heating element while maintaining the motor in circuit through the second closure.

3. A safety control for an electrically operated heat generating system, a circuit closure in circuit with one pole of the source of electricity, a heating element in circuit with said closure and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the energized heating element will operate the expansible and contractible member which through the associated means will cause the second closure to be operated to close the motor circuit.

4. A safety control for an electrically operated heat generating system, a circuit closure in circuit with one pole of the source of electricity, a heating element in circuit with said closure and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the energized heating element will operate the expansible and contractible member which through the associated means will cause the second closure to be operated to close the motor circuit, a thermal element associated with the expansible and contractible member arranged to be effected by the heat generated by the system upon the operation of the motor to cause a further operation of the expansible and contractible member to actuate said associated means to break the circuit through the first closure and heating element while maintaining the motor in circuit through the second closure.

5. A safety control for an electrically operated heat generating system, a circuit closure in circuit with one pole of the source of electricity, a heating element in circuit with said closure and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the energized heating element will operate the expansible and contractible member which through the associated means will cause the second closure to be operated to close the motor circuit, a thermal element associated with the expansible and contractible member arranged to be effected by the heat generated by the system upon the operation of the motor to cause a further operation of the expansible and contractible member to actuate said associated means to break the circuit through the first closure and heating element while maintaining the motor in circuit through the second closure and upon failure of heat generation through its associated means to break the motor circuit.

6. A safety control for an electrically operated heat generating system, a circuit closure in circuit with one pole of the source of electricity, a heating element in circuit with said closure and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the associated means will cause the second closure to be operated to close the motor circuit, a thermal element associated with the expansible and contractible member arranged to be affected by the heat generated by the system upon the operation of the motor to actuate said associated means to break the circuit through the first closure and heating element while maintaining the motor in circuit through the second closure and upon failure of heat generation through its associated means to break the motor circuit, an electromagnet in circuit between the first closure and the second mentioned pole adapted to be placed in circuit with the first pole when the first closure is operated to break the heating element circuit, and a lock operated by the energized magnet adapted to maintain the first closure in its second position until manually released.

7. A safety control for an electrically operated heat generating system, a circuit closure in circuit with one pole of the source of electricity, a heating element in circuit with said closure and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the associated means will cause the second closure to be operated to close the motor circuit, a thermal element associated with the expansible and contractible member arranged to be affected by the heat generated by the system upon the operation of the motor to actuate said associated means to break the circuit through the first closure and heating element while maintaining the motor in circuit through the second closure, an electrically operated signal device connected to the first closure when the first circuit therethrough is broken, a third closure in circuit between the signal device and the second mentioned pole moving in unison with the second closure and arranged to break said signal circuit when the motor circuit is closed and to close said signal circuit when the motor circuit is broken, said expansible and contractible member upon failure of heat generation through its associated means operating to break the motor circuit.

8. A safety control for an electrically operated heat generating system, a circuit closure in circuit with one pole of the source of electricity, a heating element in circuit with said closure and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the associated means will cause the second closure to be operated to close the motor circuit, a thermal element associated with the expansible and contractible member arranged to be affected by the heat generated by the system upon the operation of the motor to actuate said associated means to break the circuit through the first closure and heating element while maintaining the motor in circuit through the second closure and upon failure of heat generation through its associated means to break the motor circuit, an electromagnet in circuit between the first closure and the second mentioned pole adapted to be placed in circuit with the first pole when the first closure is operated to break the heating element circuit, a lock operated by the energized magnet adapted to maintain the first closure in its second position until manually released, an electrically operated signal device connected to the first closure and adapted to be placed in circuit with said first pole of the source of electricity through said closure when the first circuit therethrough is broken, a third closure in circuit between the signal device and the said second mentioned pole moving in unison with the second closure and arranged to break said signal circuit when the motor circuit is closed and to close the said signal circuit when the motor circuit is broken, said expansible and contractible member upon failure of heat generation through its associated means operating to break the motor circuit.

9. A safety control for an electrically operated heat generating system, a circuit closure in circuit with one pole of the source of electricity, a heating element in circuit with said closure, and the other pole of said source, a motor in circuit with the latter pole of said source, a second circuit closure in circuit between the motor and first mentioned pole of said source, an expansible and contractible member associated with the heating element, means associated with the expansible and contractible member to operate said closures, normally maintaining the first closure in circuit with the heating element and the second closure in open position, whereby when the main circuit is closed through the first closure the energized heating element will operate the expansible and contractible member which through the associated means will cause the second closure to be operated to close the motor circuit, a thermal element associated with the expansible and contractible member arranged to be effected by the heat generated by the system upon the operation of the motor to cause a further operation of the expansible and contractible member to actuate said associated means to break the circuit through the first closure and heating element while maintaining the motor in circuit through the second closure and upon failure of heat generation through its associated means to break the motor circuit, an electro-magnet in circuit between the first closure and the second mentioned pole adapted to be placed in circuit with the first pole when the first closure is operated to break the heating element circuit, a lock operated by the energized magnet adapted to maintain the first closure in its second position until manually released, an electrically operated signal device connected to the first closure and adapted to be placed in circuit with said first pole of the source of electricity through said closure when the first circuit therethrough is broken, a third closure in circuit between the signal device and the latter mentioned pole moving in unison with the second closure and arranged to break said signal circuit when the motor circuit is closed and to close the said signal circuit when the motor circuit is broken, said expansible and contractible member upon failure of heat generation through its associated means operating to break the motor circuit, a resistance element adapted to be placed in the motor circuit to vary the speed of the motor, and a circuit closure controlling said resistance arranged to be operated by the energization of the electro-magnet.

IRA E. McCABE.